US012291225B2

(12) United States Patent
Franz et al.

(10) Patent No.: US 12,291,225 B2
(45) Date of Patent: May 6, 2025

(54) METHOD FOR OPERATING A VEHICLE

(71) Applicant: Bayerische Motoren Werke Aktiengesellschaft, Munich (DE)

(72) Inventors: Gunnar Franz, Ottobrunn (DE); Sonja Ruemelin, Munich (DE); Peter Schneider, Haar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 347 days.

(21) Appl. No.: 18/008,794

(22) PCT Filed: May 19, 2021

(86) PCT No.: PCT/EP2021/063222
§ 371 (c)(1),
(2) Date: Dec. 7, 2022

(87) PCT Pub. No.: WO2021/249732
PCT Pub. Date: Dec. 16, 2021

(65) Prior Publication Data
US 2023/0219588 A1 Jul. 13, 2023

(30) Foreign Application Priority Data

Jun. 8, 2020 (DE) ...................... 10 2020 115 103.9

(51) Int. Cl.
*B60W 50/10* (2012.01)
*B60W 50/16* (2020.01)
*B60W 50/14* (2020.01)
*B60W 60/00* (2020.01)
*B62D 15/02* (2006.01)

(52) U.S. Cl.
CPC ............ *B60W 50/10* (2013.01); *B60W 50/16* (2013.01); *B60W 2050/143* (2013.01); *B60W 2050/146* (2013.01); *B60W 60/0053* (2020.02); *B60W 2420/403* (2013.01); *B60W 2420/408* (2024.01); *B60W 2420/54* (2013.01); *B62D 15/025* (2013.01)

(58) Field of Classification Search
None
See application file for complete search history.

(56) References Cited

U.S. PATENT DOCUMENTS 4,728,939 A * 3/1988 Otani ..................... G08B 21/06
340/576
2018/0093675 A1 4/2018 Holub et al.
2019/0009791 A1 1/2019 Hergeth
2019/0118852 A1 * 4/2019 Suzuki ................... B60K 26/02
2019/0258250 A1 * 8/2019 Naruse ................. G05D 1/0061
2022/0297629 A1 * 9/2022 Morita ............. B60R 21/21656

FOREIGN PATENT DOCUMENTS

| CN | 106662423 A | * | 5/2017 | ............. B62D 1/046 |
|---|---|---|---|---|
| CN | 110997450 A | * | 4/2020 | ............. B60K 35/00 |
| CN | 111301510 A | * | 6/2020 | ........... B60N 2/5685 |
| DE | 10 2006 006 995 A1 | | 8/2007 | |
| DE | 10 2016 219 795 A1 | | 4/2018 | |
| DE | 10 2016 225 452 A1 | | 6/2018 | |
| EP | 3 429 906 B1 | | 5/2020 | |
| FR | 3039494 A1 | * | 2/2017 | |
| JP | 2018154316 A | * | 10/2018 | |
| JP | 2021020560 A | * | 2/2021 | ............... B62D 1/06 |
| WO | WO-2015165787 A1 | * | 11/2015 | ........... B60W 40/08 |
| WO | WO 2017/157588 A1 | | 9/2017 | |
| WO | WO 2020/104160 A1 | | 5/2020 | |

OTHER PUBLICATIONS

International Search Report (PCT/ISA/210) issued in PCT Application No. PCT/EP2021/063222 dated Aug. 23, 2021 with English translation (six (6) pages).
German-language Written Opinion (PCT/ISA/237) issued in PCT Application No. PCT/EP2021/063222 dated Aug. 23, 2021 (eight (8) pages).
German-language Search Report issued in German Application No. 10 2020 115 103.9 dated Feb. 27, 2021 with partial English translation (10 pages).

* cited by examiner

*Primary Examiner* — Justin S Lee
(74) *Attorney, Agent, or Firm* — Crowell & Moring LLP

(57) ABSTRACT

A vehicle may be operated in a driving mode with autonomous lateral control and in a driving mode with manual lateral control, where the vehicle has a steering lever with a steering lever range, and where the steering lever range represents a circular space which is delimited about 360° by a rotational movement of the steering lever about a steering lever axis of rotation. A method associated with the vehicle may include one or more of the following steps: operating the vehicle in a driving mode with autonomous lateral control; detecting an intrusion in the steering lever range and/or a breaching of a predefined distance from the steering lever range by the vehicle occupant or another object with a sensor unit without the vehicle occupant coming into contact with the steering lever; and signaling the intrusion and/or the breaching of the distance to the vehicle occupant.

11 Claims, 1 Drawing Sheet

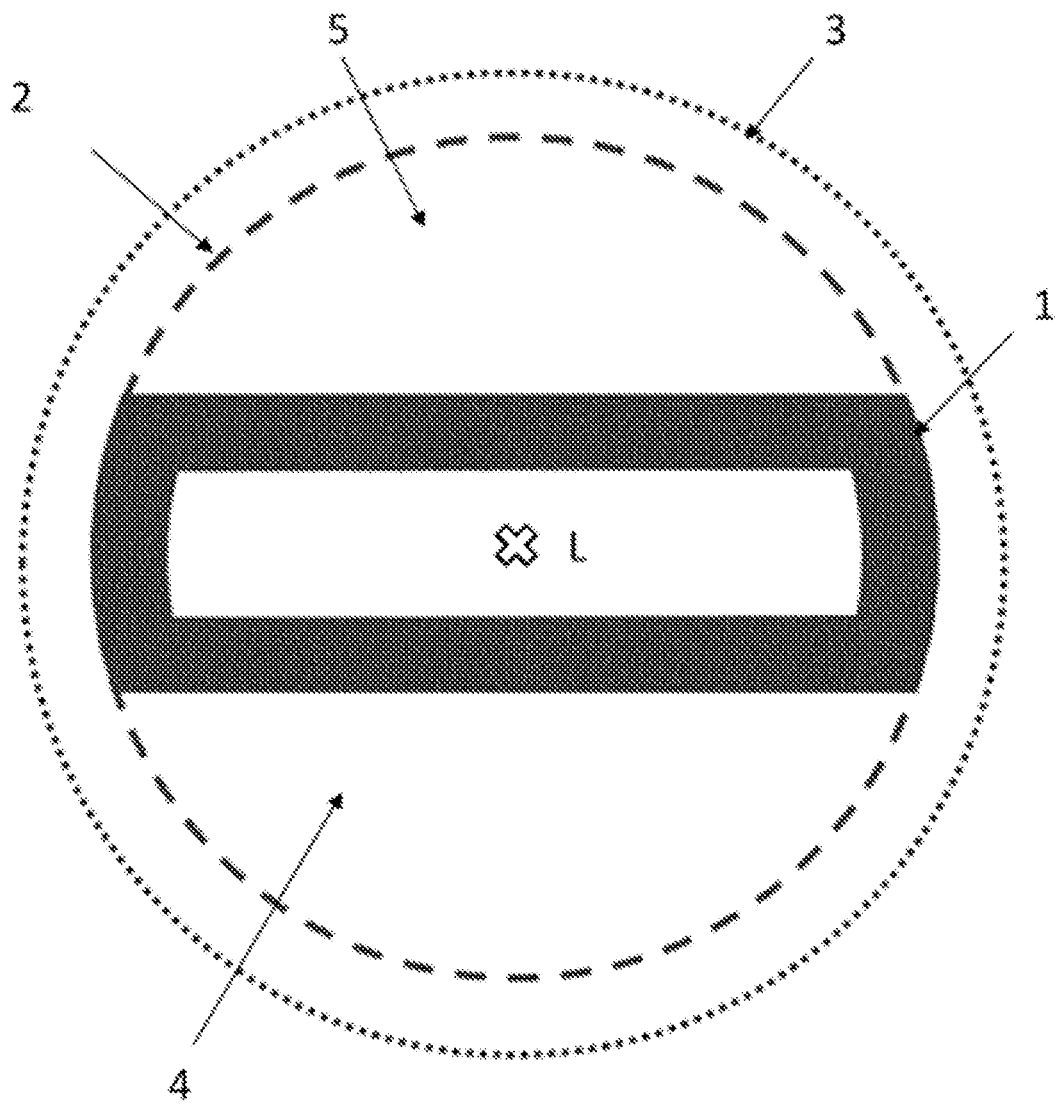

METHOD FOR OPERATING A VEHICLE

BACKGROUND AND SUMMARY

The invention relates to a method for operating a vehicle and a vehicle and a steering handle. In relation to the prior art, reference is made by way of example to EP 3 429 906 B1 and DE 10 2016 225 452 A1.

The prior art discloses many designs of highly automated driving and the driver assistance systems responsible for this. Thus, for example, driver assistance systems are known which assist the driver in the driving task or even those which cause the vehicle to completely take over specific driving tasks such as, for example, the longitudinal control and/or the lateral control of a vehicle. Here, in safety-critical situations in which the assistance function of the driver assistance systems is no longer adequate, the driver is requested by the driver assistance system to take over the vehicle control themselves. This request is designated the takeover request. In addition, the driver always remains capable if desired of intervening in the highly automated task of the driver assistance system and therefore of taking over the driving task manually. Depending on the driving task performed by the driver assistance system, there exist different takeover concepts, that is to say ways or actions which the driver carries out in order to signal that he wishes to take over the respective driving task himself and therefore to deactivate the driver assistance system which is carrying out the highly automated driving task at that time. During highly automated lateral control, takeover designs using interventions in the steering wheel, that is to say an actuation of the steering wheel by the driver, are known. Thus, for example, EP 3 429 906 B1 discloses a takeover design in which the lateral control is taken over by the vehicle occupant when the latter touches a specific area of the steering handle. The steering wheel is subdivided into explicit areas, wherein the lateral control is taken over by the vehicle occupant only when specific areas are touched. In this way, an involuntary transfer from the autonomous lateral control to the manual lateral control by the driver, for example as a result of a slight touch or unintended rotation of the steering wheel, for example as a result of the knee of the driver leaning against the steering wheel, can be prevented.

With the concept of the aforementioned autonomous or highly automated driving, novel and other geometric configurations have resulted, in particular with regard to the possibilities of space utilization within the vehicle interior. A steering handle that is conventionally and originally known as a circular steering wheel is increasingly being replaced by smaller, space-saving and ergonomic steering handle concepts. For example, DE 10 2016 225 452 A1 discloses such a steering handle which does not have a circular form. The conventional steering rim is replaced by two steering elements which function as a handle. The handles are coupled to each other and to the steering angle, so that these always move synchronously. A steering movement about the mid-axis is initiated by moving the handles.

Such steering handle concepts, which are not designed to be circular, are usually designed such that in a zero position, that is to say in the non-deflected state, a vehicle occupant has more free leg space, since the conventional circular arc-shaped steering wheel section is no longer arranged on the lower half of the steering wheel. When traveling straight ahead, the driver can use this space for his legs. However, for example when cornering, when the steering handles are rotated about their axis of rotation, this free space is utilized by the steering handle. If, then, during such cornering, the legs of the driver are still within this free space, then costs in terms of convenience or conflicts can occur since, as a result of the steering lock, the steering handle takes up this space. For example, it is then possible for an undesired or unintended transfer from an autonomous to a manual driving mode to occur although the vehicle occupant is not prepared for manual vehicle control.

As a result of rotating the steering handle into the already occupied free space, under certain circumstances the rotational movement of the steering handle is hampered, which, for example, can result in an unpleasant collision of the steering handle with a part of the body of the vehicle occupant.

It is thus an object of the invention to indicate a method for operating a vehicle in which the aforementioned disadvantages can be prevented.

The object is achieved by a method for operating a vehicle having the features of the independent claim, and by a vehicle, and a steering handle for the vehicle, for carrying out related methods. Advantageous refinements and developments form the content of certain dependent claims.

A method of operating a vehicle is proposed, wherein the vehicle can be operated in a driving mode with autonomous lateral control and in a driving mode with manual lateral control.

During autonomous lateral control, the vehicle driver or the vehicle occupant does not touch a steering handle and the vehicle performs the steering task completely.

Provision is preferably made that during such autonomous lateral control by the vehicle, the steering handle is coupled to the steered vehicle wheels in such a way that the steering handle carries out an actual rotation about its axis of rotation when the vehicle is steered. During manual lateral control, it is a task of the vehicle driver or a vehicle occupant to operate the steering handle and therefore to steer the vehicle.

As already mentioned, the vehicle comprises a steering handle. This steering handle comprises a steering handle range. In the sense of this invention, such a steering handle range describes a three-dimensional space which is formed by a plurality of circular paths through which the steering handle geometry passes during a 360° rotation of the steering handle about its steering axis. If, therefore, the steering handle is rotated by 360° about its steering axis (a complete revolution), then the steering handle geometry runs through a virtual circularly symmetrical path, the virtual span of which path then in turn forms the aforementioned space represented by the steering handle range. Accordingly, the space is at least as large as the steering handle itself. Accordingly, the dimensions of the space are selected at least such that at least part of the steering handle occupies this space in a specific rotated position or in a specific steering handle rotational angle.

Particularly preferably, this space and the steering handle range are even chosen to be slightly larger so that, in addition to the steering handle itself, there is still more space, specifically what is known as a tolerance band. The tolerance is in particular helpful in order to be configured to be robust with respect to vibrations and to ensure that the hands of the vehicle occupant are able to grip the steering handle at any time and at any steering angle.

Furthermore, in a preferred embodiment of the invention, the steering handle is not designed to be circular. If the steering handle is therefore no longer designed to be circular in its geometric form but, for example, in the form of a narrow rectangle, in an oval form or in the form of a strip or the like, then, depending on the rotational angle of the steering handle, this steering handle range can be assumed completely by the steering handle in its rotational situation. That part of the space which is currently not assumed by the steering handle itself in the specific rotational situation of the steering handle constitutes a free space which merges seamlessly into the vehicle interior.

In a preferred embodiment of the invention, the steering handle is formed in such a way that during a steering handle zero position, that is to say when the steering handle is not rotated, which, for example, is established when the vehicle is traveling straight ahead, the aforementioned free space represents additional space for the legs or the lower body of a vehicle occupant on the vehicle driving seat.

In an initial position for the proposed method, the vehicle is in a driving mode with autonomous lateral control. The vehicle or a suitable driver assistance system of the vehicle performs the vehicle lateral control. The driver or a vehicle occupant does not have his hands on the steering handle. Preferably, the vehicle is also in operation, that is to say during the journey.

If, in such an autonomous lateral control driving mode of the vehicle, it is detected that the above-described free space of the steering handle range is at least partly occupied by an object or a part of the body of the vehicle occupant and/or a predefined distance to this free space is breached by an object or a part of the body of the vehicle occupant, then this is signaled to a vehicle occupant.

If, for example, the knee of a driver is located in the free space of the steering handle range when the vehicle is traveling straight ahead, that is to say in the space of the steering handle range which, in this specific steering situation, is not currently occupied by the steering handle, then provision is made for a warning or a signal to be given to the vehicle occupant.

As a result of an appropriate warning, the vehicle occupant can be signaled that an object or a part of the body of the vehicle occupant is intruding into the free space or the aforementioned distance to the free space is being breached. As a result, the vehicle occupant can remove the object or the part of the body from the free space. A possible undesired future collision of the object or the part of the body with a steering handle rotating into the free space can advantageously be avoided if the vehicle occupant removes the object or moves the part of the body out of the free space because of the signal.

Such a warning or signaling to a vehicle occupant can be provided, for example, via an acoustic and/or a visual and/or a haptic signal. Particularly preferably, this signal is formed redundantly so that, in the event of failure of one signal path, another signal path is established.

For example, visual feedback or signaling can be provided in a vehicle instrument cluster or in a head-up display (abbreviated HUD) or in other available indicating elements.

This visual feedback can be given, for example, in the form of a static icon, as a text (for example with the text "please take knee/object out of the steering range"), as an action-indicating animation or the like. Such an action-indicating animation can be implemented, for example, by demonstrating repositioning of the interfering object or the part of the body of the vehicle occupant.

In the case of acoustic signaling, for example a warning sound or an output of speech relating to the action instruction could be provided.

As a haptic signal or warning, for example, one or more vehicle interior parts, such as a vehicle seat or a pedal set or the steering handle itself, could vibrate.

In a preferred embodiment of the invention, the aforementioned method steps are carried out repeatedly in a predefined time interval. If it is detected that, following signaling or a warning carried out as described above, no removal of the object or of the part of the body of the occupant has been carried out, further measures can be initiated, for example by a control unit. Amongst other things, it is possible that after such an (unsuccessful) warning, a request is made to the vehicle occupant relating to manual vehicle control, in particular to manual lateral control of the vehicle and/or longitudinal control of the vehicle.

Furthermore, it is possible to escalate the situation further in that, directly after unsuccessful signaling or after an unsuccessful request to take over the vehicle control, the vehicle is brought to a standstill.

The intrusion into the aforementioned free space or the breaching of the distance to the free space is detected by at least one sensor unit. The subsequent signal output and a possible subsequent request to take over or stop the vehicle is preferably carried out by one or more cooperating control units.

The sensor unit here can represent at least one optical sensor or at least one ultrasound sensor or at least one capacitive sensor or at least one radar sensor or at least one lidar sensor.

Because of partly difficult light conditions in the area to be monitored, in the case of optical sensors it is preferred to use correspondingly light-intense cameras such as, for example, infrared cameras or additional lighting (possibly also in the UV range).

For example, one or more interior camera or cameras could be used as an optical sensor. Here, sensor units already present in the vehicle and in particular an interior camera could be used. Such a camera can be arranged, for example, in the ceiling of the vehicle interior or in the vehicle roof.

In addition, such a sensor unit can be arranged in the footwell or directly underneath the steering handle in a footwell area of the vehicle occupant, in particular under a steering column cover.

The proposed method, the proposed vehicle for carrying out the method and the proposed steering handle for such a vehicle make it possible to avoid costs in terms of inconvenience for a vehicle occupant during autonomous lateral control of the vehicle. Furthermore, conflict situations can advantageously be resolved and unpleasant and undesired situations can be avoided.

These and further features additionally emerge from the claims and from the description and also from the drawings, wherein the individual features can each be implemented on their own or in a plurality in the form of sub-combinations in an embodiment of the invention and can represent embodiments that are advantageous and capable of protection on their own, for which protection is claimed here.

BRIEF DESCRIPTION OF THE DRAWINGS

The invention will be explained further in the following by using an exemplary embodiment. In the single FIGURE, a steering handle 1 in the installed state in a vehicle (the vehicle not shown in its entirety) is illustrated schematically in a front view. All the features described in more detail can be important to the invention.

DETAILED DESCRIPTION OF THE DRAWINGS

The vehicle, which can be steered with the steering handle 1 shown, can be operated both in a manual driving mode and in an autonomous driving mode. In a manual driving mode, the lateral control of the vehicle, that is to say the steering of the vehicle, is carried out via an operation of the steering handle 1 or via a rotation of the steering handle about the steering axis L. In an autonomous driving mode of the vehicle, the vehicle or a driver assistance system takes over the lateral control of the vehicle. In such an autonomous driving mode, provision is made in this practical example for the steering handle 1 to be coupled to the steered vehicle wheels in such a way that the steering handle 1 likewise corotates synchronously with the actual steering angle of the wheels.

In this case, the steering handle is not circular, as in conventionally known steering handles, but designed in the form of a narrow at least approximately oval construct. The position illustrated in the FIGURE of a steering handle 1 installed in the vehicle with respect to the steering axis L represents the zero position or neutral position of the steering handle 1, in which the wheels of the vehicle are not subjected to any steering lock. In this zero position of the steering handle 1 when installed in the vehicle, the vehicle is accordingly traveling in a straight line.

Likewise, the steering handle range 2 can be seen in the FIGURE in the form of a first dashed line. This steering handle range 2 represents a space, disk-shaped in this case, which is formed by a virtual outermost rotational path passed through by the steering handle geometry 1 during a 360° rotation of the steering handle 1 about its steering axis L.

If, therefore, the steering handle 1 is rotated about its steering axis L, then, depending on the rotational angle, this always needs at least part of the aforementioned space or the steering handle range 2. However, since the steering handle 1 is not formed circularly, corresponding to the steering handle range 2, and does not occupy the latter completely, there is a free space within the steering handle range 2 at all times. In the case of a neutral position of the steering handle 1, as is illustrated in the FIGURE, a lower part 4 and an upper part 5 of the steering handle range 2 are formed as a free space.

When the steering handle 1 is installed, in the neutral position of the steering handle 1 the legs of a vehicle occupant who is on a driver's seat are located underneath the steering handle 1. Here, it is possible that, during autonomous lateral control of the vehicle, this vehicle occupant has arranged his legs in the lower free space 4 of the steering handle range 2 in this case.

If, then, the steering handle position changes during the travel with the autonomous lateral control and the steering handle 1 rotates, for example, to the left or the right about its steering axis L, it is possible that the legs of the vehicle occupant placed in the lower free space 4 can accidentally collide with part of the steering handle 1.

In the event of such a collision, it is possible for discomfort or a worrying driving situation to occur.

In order to avoid such a collision, it is therefore provided that such an intrusion into or such an occupation of the free space 4, 5 of the steering handle, for example by the legs of a vehicle occupant, is detected during a journey with autonomous lateral control. This detection can be made in a manner already described, for example via suitable camera systems or other sensors. In the event of such a detection, provision is then made for the vehicle occupant to be warned in a manner likewise described, or to be requested to remove the legs or the interfering object from the free space.

In this case, the steering handle range 2 is also provided with a tolerance band 3 (likewise illustrated by a dashed line). Thus, in this case, a vehicle occupant is already warned if an object or a part of the body of the vehicle occupant breaches a specific distance from the tolerance band 3 or if an intrusion is made into the tolerance band 3.

The invention claimed is:

1. A method for operating a vehicle, wherein the vehicle is operable in a driving mode with autonomous lateral control and in a driving mode with manual lateral control,
   wherein the vehicle comprises a steering handle with a steering handle range, wherein the steering handle range represents a space which is formed by a virtual rotational path through which the steering handle geometry passes during a 360° rotation of the steering handle about its steering axis,
   the method comprising the following steps:
      operating the vehicle in a driving mode with autonomous lateral control;
      detecting an intrusion into a free space of the steering handle range and/or a breaching of a predefined distance to the free space of the steering handle range by a vehicle occupant or another object with a sensor unit and without necessitating the vehicle occupant touching the steering handle; and
      signaling the intrusion and/or the breaching of the distance to the vehicle occupant.

2. The method according to claim 1, wherein the steps from claim 1 are carried out repeatedly in a predefined time interval, and wherein, upon the detection of an intrusion that continues to exist and/or a breaching of the distance that continues to exist, requesting a vehicle occupant to take over manual vehicle control and/or stopping the vehicle.

3. The method according to claim 1, wherein the steering handle range comprises a tolerance band in addition to the space, and wherein, upon the detection of an intrusion into the tolerance band and/or a breaching of a predefined distance to the tolerance band, a corresponding tolerance band signal is sent to the vehicle occupant.

4. The method according to claim 1, wherein the signaling is carried out at least one of optically, acoustically, and haptically.

5. The method according to claim 1, wherein the signaling is carried out redundantly.

6. A vehicle for carrying out the method according to claim 1,
   wherein the vehicle can be operated in a driving mode with autonomous lateral control and in a driving mode with manual lateral control, and wherein
   the vehicle comprises:
      a sensor unit which is configured to detect the intrusion into the steering handle range and/or the breaching of the distance to the free space of the steering handle range; and a control unit, which is configured to generate the signal to a vehicle occupant when the intrusion and/or the breach occurs.

7. The vehicle according to claim 6, wherein the control unit is designed to send a request to the vehicle occupant to take over the vehicle control and/or to stop the vehicle if the intrusion and/or the breaching of the distance continues to exist after signaling has been carried out.

8. The vehicle according to claim 6, wherein the sensor unit includes at least one of an optical sensor, an ultrasound sensor, a capacitive sensor, a radar sensor, and a lidar sensor.

9. The vehicle according to claim 6, wherein the sensor unit is arranged at at least one of a footwell area and a vehicle ceiling.

10. A steering handle for a vehicle, which is constructed according to claim 6, wherein the steering handle is mounted such that it can rotate about a steering axis, and wherein the steering handle is configured such that at least part of the space of the steering handle range is formed as a free space in every rotational position of the steering handle.

11. The steering handle according to claim 10, wherein the steering handle is coupled to the vehicle wheels such that in an autonomous lateral control driving mode of the vehicle, a rotational movement of the steering handle about the steering axis is carried out.

* * * * *